UNITED STATES PATENT OFFICE.

DAVID FRANKLIN LUCKEY, OF COLUMBIA, MISSOURI.

PROCESS OF PRODUCING HOG-CHOLERA ANTITOXIN.

1,012,874. Specification of Letters Patent. Patented Dec. 26, 1911.

No Drawing. Application filed February 15, 1911. Serial No. 608,716.

*To all whom it may concern:*

Be it known that I, DAVID FRANKLIN LUCKEY, a citizen of the United States, residing at Columbia, in the county of Boone and State of Missouri, have invented a certain new and useful Improvement in Processes of Producing Hog-Cholera Antitoxin, of which the following is the specification.

This invention relates to processes of producing hog cholera antitoxin.

The object of my invention is to provide a process which enables hog cholera antitoxin to be produced from certain kinds of animals, quickly and at a low cost.

Hog-cholera antitoxin has heretofore been obtained by treating an immune pig with serum or with defibrinated blood obtained from pigs sick of hog-cholera. By one or more treatments the immune pig is rendered hyperimmune and hog-cholera antitoxin is thereby formed in the blood. It is somewhat difficult to obtain an ample supply of blood from pigs which are sick of hog-cholera and preserve the blood in such a state as to retain its virulence and be suitable for use in the hyperimmunizing process. Furthermore, only a comparatively small quantity of blood can be drawn from a hyperimmunized pig at one time and the number of drawings that can be made from one pig is limited. On the other hand, domestic animals larger than the hog such, for example, as the horse, the mule or the ox, are capable of producing large quantities of virulent blood and of hog-cholera antitoxin, and the number of times the blood may be drawn from such animals is practically unlimited. The intravenous injection of the horse, mule or ox with the blood obtained from pigs sick of hog-cholera, exerts a harmful or sickening effect on such animal; especially, when these injections are repeated or are given in sufficient quantities to produce hyperimmunization. These adverse effects are sufficient to make it impracticable to treat the horse, mule or ox with sufficient amounts of virulent hog's blood and at the necessary intervals to produce in them the necessary hyperimmunity and cause the formation of potent hog-cholera antitoxin in the blood of these animals. However, the intravenous injection of a small amount of blood obtained from pigs sick of hog-cholera into the veins of an animal of the character above-referred to, does not materially injure the animal yet causes the whole amount of its circulating blood to temporarily become highly virulent as to hog-cholera. The blood of the animal being treated becomes so virulent that the subcutaneous injection of a pig not immune from hog-cholera with a very small quantity of such blood causes the pig to become sick of hog-cholera, these facts applying with equal force to the virulent blood of any of the animals above-mentioned, namely, the horse, the mule, or the ox. Furthermore, the injection of a pig immune from cholera, with virulent blood drawn from any of the animals above-referred to, exerts a harmful or sickening effect on such pig; especially when these injections are repeated and sufficiently large to produce hyperimmunity of the pig. It is therefore impracticable to use the virulent pig's blood in hyperimmunizing the horse, the mule or the ox, and it is also impracticable to use the virulent blood of the horse, the mule or the ox in hyperimmunizing the pig.

I have discovered that the virulent blood produced in the veins of an animal of the character above-referred to may be used in hyperimmunizing another animal of the same kind or class without causing any ill effects in the animal that is hyper-immunized. Consequently, I am able to produce quickly and at a comparatively low cost hog-cholera antitoxin, owing to the fact that the animals which I hyperimmunize such, for example, as the horse, the mule or the ox, are capable of producing large quantities of hog-cholera antitoxin and can be bled innumerable times.

Briefly stated, my process consists in the intravenous injection of a domestic animal larger than the hog with virulent hog-cholera blood, thereafter treating a second animal of the same kind or class with virulent blood drawn from the animal into which the virulent hog's blood was injected, and finally drawing blood from this second animal and defibrinating the blood or allowing the blood to stand until the serum separates from the clot and rises to the top of the mass where it can be drawn off. The defibrinated blood or the serum is then treated with some suitable preserving agent and sealed in sterilized containers until used.

In practicing my process, I first produce a high state of hog-cholera virulence in the blood of an animal of the character referred to by an intravenous injection of a small quantity of blood obtained from pigs sick of hog-cholera, say, for example, fifteen cubic centimeters, more or less, of blood. Within a certain time thereafter say, for example, about an hour, I draw a supply of blood from the animal which I previously treated and whose blood is virulent as to hog-cholera, it being preferable to draw the blood from the jugular vein of the animal. This virulent blood that was drawn from the animal is thereafter defibrinated or allowed to stand until the serum rises and is drawn off and the defibrinated blood or the serum is then injected, preferably intravenously, into a second animal of the same kind or class. That is to say, if the first animal above-mentioned is a horse the second animal treated, and from which the final product is obtained, will also have to be a horse. The injections of this virulent defibrinated blood or serum into the second animal are repeated at intervals of about eight days and increased or decreased according to the tolerance of the animal being treated, thus causing the formation of potent hog-cholera antitoxin in the blood of the said second animal. The quantity of blood used in each injection will vary in different animals of the same kind or class but, as a rule, the first injection consists of one quart of virulent blood. The amount used in subsequent injections would be gradually increased according to what the individual animal being treated will tolerate.

The animal that has been treated in the manner above-described becomes hyperimmunized or forms in its blood what is known as "hog-cholera antitoxin." Its blood is then drawn and defibrinated and left to stand until the serum separates from the clot and rises to the top where it can be drawn off. Thereafter, the defibrinated blood or the serum is treated with some suitable preserving agent and sealed in sterilized containers until used.

In treating pigs with hog-cholera antitoxin produced by the process above-described the defibrinated blood or the serum is injected subcutaneously or otherwise in doses of approximately twenty cubic centimeters for the purpose of immunizing the pig against hog-cholera, the antitoxin being injected either by the "serum-alone" method or the "serum-simultaneous" method.

In view of the fact that there is no generic expression or term which includes the horse, the mule, or the ox, I have used the expression domestic animal larger than the hog in the claims to mean either a horse, a mule, or an ox.

I claim:

1. A process of producing hog-cholera antitoxin which consists in injecting virulent hog-cholera blood into a domestic animal larger than the hog, thereafter drawing virulent blood from said animal and injecting it into a second animal of the same kind or class so as to hyperimmunize said second animal, and finally drawing blood from said hyperimmunized animal.

2. A process of producing hog-cholera antitoxin which consists in injecting intravenously virulent hog-cholera blood into a domestic animal larger than the hog, subsequently drawing blood from said animal and injecting it intravenously into a second animal of the same kind or class so as to hyperimmunize said second animal, drawing blood from said hyperimmunized animal, and finally converting said blood into defibrinated blood or serum.

DAVID FRANKLIN LUCKEY.

Witnesses:
JOHN E. SYKES,
THOMAS MILLER MAUGHS.